UNITED STATES PATENT OFFICE.

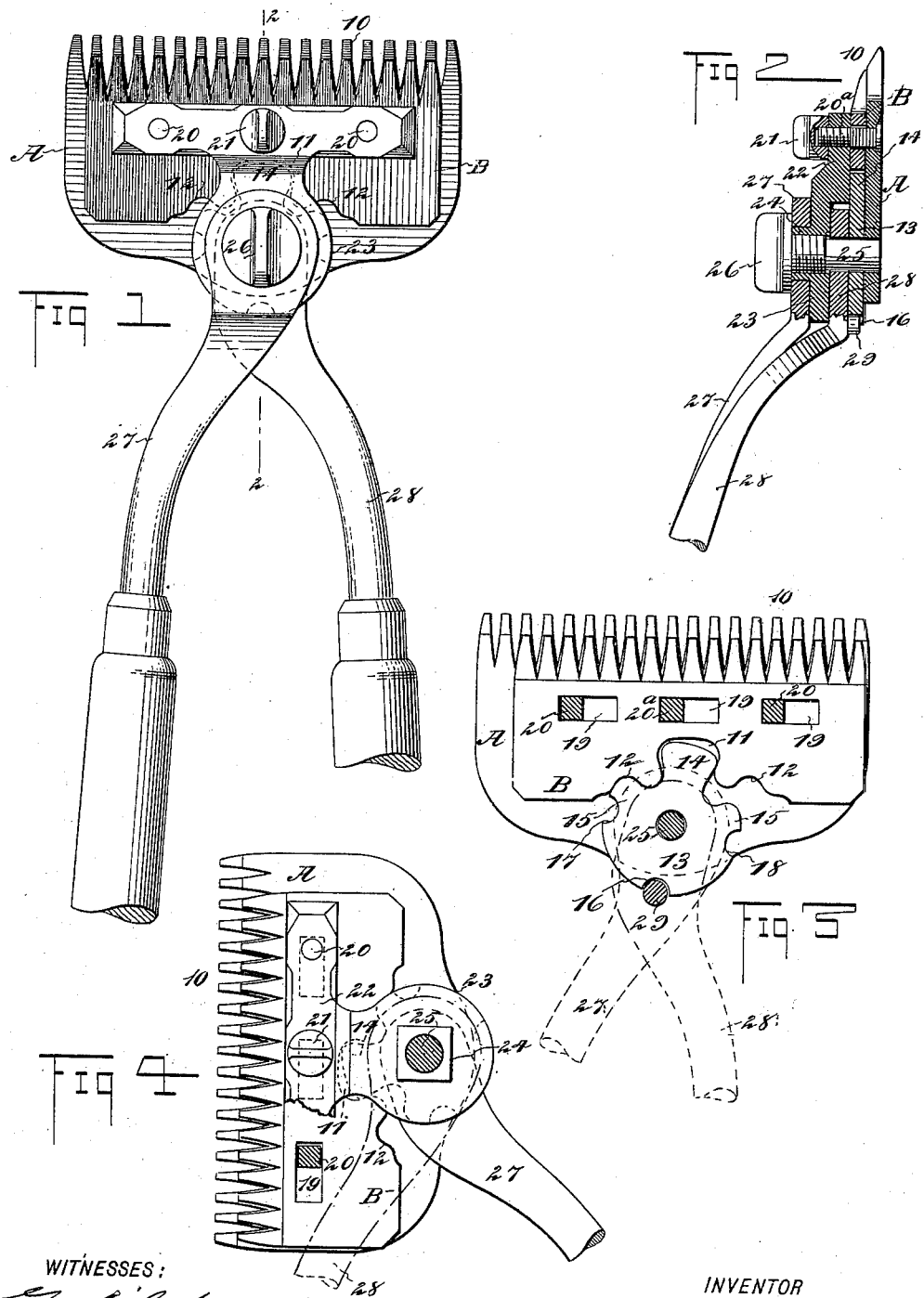

ALLAN QUARRIE, OF OAK LAKE, CANADA.

CLIPPER.

SPECIFICATION forming part of Letters Patent No. 662,302, dated November 20, 1900.

Application filed August 2, 1900. Serial No. 25,665. (No model.)

*To all whom it may concern:*

Be it known that I, ALLAN QUARRIE, a subject of the Queen of Great Britain, and a resident of Oak Lake, in the Province of Manitoba and Dominion of Canada, have invented certain new and useful Improvements in Clippers, of which the following is a full, clear, and exact description.

The purpose of the invention is to provide a clipper especially adapted for removing or clipping hair from animals and which consists of but few parts simply assembled, and to so construct the device that the handles may operate the movable cutter-plate when placed in any one of three positions, one position being that which is known as "straight" or at right angles to the cutting-face of the machine, another position being at the right-hand side of the said cutting-face, and the third position at the left-hand side of the cutting-face, thus enabling the machine to be advantageously and conveniently used on all portions of an animal's body and limbs.

The invention consists in the novel construction and combination of the several parts, as will be hereinafter fully set forth and pointed out in the claims.

Reference is to be had to the accompanying drawings, forming a part of this specification, in which similar characters of reference indicate corresponding parts in all the figures.

Figure 1 is a plan view of the improved clipper. Fig. 2 is a central transverse section taken practically on the line 2 2 of Fig. 1. Fig. 3 is a horizontal section taken just above the movable cutter-plate; and Fig. 4 is a plan view of the clipper, parts being broken away and the handles being shown at one side of the center of the cutting-face.

A represents a fixed or permanent cutter-plate, and B the upper cutter-plate, adapted to laterally reciprocate upon the lower or fixed cutter-plate, both plates being provided with the usual cutting fingers or blades 10. The upper or movable cutter-plate B is provided at the central portion of its rear edge with a recess 11, more or less contracted at the edge of the plate, as shown in Fig. 3, and a smaller recess 12 is produced in the said rear edge of the movable cutter-plate B at each side of the main recess 11, as is also shown in Fig. 3.

The main recess 11 is adapted to receive a main tooth 14, formed integral with or attached to a disk 13, mounted to revolve upon the upper face of the fixed cutter-plate A at its rear, since the rear portion of the fixed cutter-plate A extends beyond the corresponding portion of the movable cutter-plate B, as is shown in Figs. 1, 3, and 4. The disk 13 is provided with two additional teeth 15, located one at each side of the main tooth or projection 14, and these additional or side teeth 15 are adapted to alternately enter the smaller recesses 12 in the reciprocating or movable cutter-plate B, and as the disk 13 is revolved in the manner to be hereinafter described a laterally-reciprocating movement is imparted to the movable cutter-plate B. The disk 13 is provided at its periphery with three recesses 16, 17, and 18. One of these recesses, the recess 16, is located at the rear central portion of the disk, while the other recesses 17 and 18 are formed, respectively, in the sides of the disk, and are preferably diametrically opposite. The movable cutter-plate B is usually provided with three longitudinal slots or openings 19, as shown best in Fig. 3. These openings are located between the front and rear edges of the said movable cutter-plate B, and pins 20 are passed through the end openings 19 of said cutter-plate B. These pins 20 where they pass through the said end openings 19 are rectangular in cross-section, but their upper and lower portions are preferably made circular in cross-section. The lower portions of the pins 20 enter suitable apertures in the fixed or lower cutter-plate A, and the upper ends of the pins 20 enter a head-bar 22, which is located longitudinally of and above the upper or movable cutter-plate B, the head-bar being so placed that it will not interfere with the movement of the said cutter-plate B. The pin 20$^a$, which is passed through the central opening or slot 19 in the upper cutter-plate B, is also rectangular in cross-section where it passes through the slot, but the lower end of this pin 20$^a$ is provided with a head countersunk in the bottom surface of the lower or fixed cutter-plate A, as shown in Fig. 2, while the upper end of the pin 20$^a$, which is passed through the central portion of a head-bar 22, is threaded, and the threaded portion of this pin is adapted to receive a nut 21, as shown in Figs. 1, 2, and 3.

The head-bar 22 at the central portion of its rear edge is provided with a projection 23, preferably of semicircular form, and this projection extends loosely over the disk 13, as is illustrated in Figs. 1, 2, and 3. On the upper face of the projection 23 a rectangular or polygonal boss 24 is formed, and an opening is made in this boss and in the central portion of the projection 23, and the wall of this opening is provided with a thread, as shown in Fig. 2. A pin 25, having a threaded upper portion, as shown in Fig. 2, is passed through the opening in the boss 24 and corresponding openings in the projection 23, and the said pin is provided at its upper end with a suitable head 26, so shaped that it may be readily turned by hand. The lower portion of the pin 25 is plain and reduced in diameter, as is also shown in Fig. 2, and this plain portion of the pin is loosely passed through a central opening in the disk 13 and into an opening in the lower or stationary cutter-plate A. Two handles 27 and 28 are used as customary in connection with the body of such devices. The handle 27, which is the uppermost handle, is provided with a polygonal opening, which opening receives the polygonal projection 24 on the extension from the head-bar 22. Therefore this handle is located between the head of the pin 25 and the extension 23. The second and lower handle 28 is provided with a circular opening through which the plain portion of the pin 25 is loosely passed, and the apertured portion of the handle 28 is located between the under face of the extension 23 and the upper surface of the disk 13, which disk may be termed an "actuating disk." These portions of the handles 27 and 28, which are placed upon the body portion of the device, are at a right angle to the main portions of the handles, and the main portions of the two handles are preferably curved outward or in opposite directions, as shown in Fig. 1. The lower handle 28 where it joins the body of the device is provided with a stud or projection 29 from its under face. This stud or projection may be fixed or may be in the form of a roller, and said stud or projection 29 is adapted to enter any one of the recesses 16, 17, or 18, made in the periphery of the disk 13. When the stud or projection 29 enters the recess 16 of the disk 13, the handle 27 is placed straight or at right angles to the body of the machine, and the handle 28, which is the movable handle, will be in like position. The movable cutter-plate is operated by carrying the movable handle 28 to or from the fixed handle 27.

If it be found convenient in the use of the device that the handles should be at the left-hand side of the center of the device, the pin 25 is loosened or removed, the fixed handle is changed so as to point in the direction of the left-hand side of the body, and the movable handle 28 is shifted so that the projection or stud 29 shall enter the left-hand recess 17 in the disk 13, whereupon this disk will operate in the same manner as if the handles were in a straight position. It frequently happens that many parts of an animal's body and limbs can be more conveniently reached by a clipper when the handles are at the right-hand side of the center, and this change in the position of the handles may be quickly made by shifting the two handles to the right and bringing the stud or projection 29 of the movable handle 28 into the right-hand recess 18 of the disk 13.

Having thus described my invention, I claim as new and desire to secure by Letters Patent—

1. In a clipper, a stationary cutter-plate, a reciprocating cutter-plate having a main central recess in its rear edge and smaller recesses at each side of the main recess, a disk having a large tooth adapted to enter the main recess in the movable cutter-plate and smaller teeth adapted to enter the smaller recesses in the movable cutter-plate, the said disk having a peripheral recess at its rear central portion, and a similar recess in each of its side portions, and a handle mounted to turn, said handle being provided with a projection adapted to enter any one of the peripheral recesses in the disk and thus enable said handle to occupy any one of three positions as desired.

2. In a clipper, a stationary cutter-plate, a reciprocating cutter-plate having a main central recess in its rear edge and smaller recesses at each side of the main recess, a disk having a large tooth adapted to enter the main recess of the movable cutter-plate and smaller teeth adapted to enter the smaller recesses in the movable cutter-plate, the said disk having a peripheral recess at its rear central portion and a similar recess in each of its side portions, a pivot around which the said disk revolves, a handle held in adjustable yet fixed position by the said pivot, and a second handle mounted to turn around the said pivot, which latter handle is provided with a projection adapted to enter any one of the peripheral recesses in the disk and thus enable said handles to occupy any one of three positions, as desired, a straight position, a position at the right, or a position at the left of a central transverse line drawn through the cutter-plates, as set forth.

In testimony whereof I have signed my name to this specification in the presence of two subscribing witnesses.

ALLAN QUARRIE.

Witnesses:
CHRIS. V. ANDERSON,
AMABLE MARION.